United States Patent
Egli et al.

(10) Patent No.: US 9,195,928 B2
(45) Date of Patent: Nov. 24, 2015

(54) CUSTOMER MEDIUM TO RECORD THE UTILIZATION OF SERVICES

(71) Applicants: SKIDATA AG, Groedig/Salzburg (AT); EM MICROELECTRONIC-MARIN SA, Marin (CH)

(72) Inventors: Charles Egli, Cheseaux (CH); Fabien Maupas, Pontarlier (FR); Jose Luis Geijo Lilma, Marin (CH); Juergen Riedel, La Neuveville (CH); Martin Schwander, Gals (CH)

(73) Assignees: SKIDATA AG, Groedig/Salzburg (AT); EM MICROELECTRONIC-MARIN SA, Marin (CH)

( * ) Notice: Subject to any disclaimer, the term of this patent is extended or adjusted under 35 U.S.C. 154(b) by 0 days.

(21) Appl. No.: 14/452,553

(22) Filed: Aug. 6, 2014

(65) Prior Publication Data
US 2015/0090800 A1   Apr. 2, 2015

(30) Foreign Application Priority Data
Aug. 6, 2013  (EP) ..................... 13179397

(51) Int. Cl.
G06K 19/07   (2006.01)
G06K 19/077  (2006.01)
G06K 19/073  (2006.01)

(52) U.S. Cl.
CPC .......... *G06K 19/073* (2013.01); *G06K 19/0712* (2013.01); *G06K 19/0724* (2013.01); *G06K 19/07707* (2013.01); *G06K 19/07767* (2013.01); *G06K 19/07794* (2013.01)

(58) Field of Classification Search
CPC ............ G06K 19/073; G06K 19/0712; G06K 19/0724; G06K 19/07707; G06K 19/07767
USPC .......................................................... 235/492
See application file for complete search history.

(56) References Cited

U.S. PATENT DOCUMENTS

| | | | |
|---|---|---|---|
| 2006/0276161 A1* | 12/2006 | Twitchell | H04W 36/14 455/343.1 |
| 2010/0051692 A1* | 3/2010 | Knudson | H05K 9/0067 235/439 |
| 2012/0309302 A1 | 12/2012 | Buhot | |
| 2013/0072255 A1 | 3/2013 | Levionnais et al. | |

* cited by examiner

*Primary Examiner* — Thien M Le
*Assistant Examiner* — Toan Ly
(74) *Attorney, Agent, or Firm* — Karl F. Milde, Jr.; Eckert Seamans Cherin & Mellott, LLC

(57) ABSTRACT

A customer medium (1) for detecting the utilization of services is proposed, comprising a first and a second antenna (2, 3) for long-range data communication, a third antenna (4), an integrated circuit (6) comprising at least one crypto-engine, one microprocessor (5) connected with the integrated circuit (6) or integrated into the integrated circuit (6), an operational amplifier (8) and an RF transceiver (7) connected to the second antenna (3), where the third antenna (4) is connected to an NFC-module in the integrated circuit (6) and is used for the short-range data communication in an active mode of the customer medium (1), where the first antenna (2) is used as a wake-up antenna for receiving an amplitude-modulated wake-up signal if the customer medium is in a "sleep" mode, where the signal received by the wake-up antenna (2) is demodulated and amplified by the operational amplifier (8) serving as the wake-up detection module and is evaluated by the microprocessor (5) partially activated in the "sleep" mode, where the microprocessor (5) is completely activated in the event of a valid wake-up signal, by which the customer medium (1) enters the active mode and where the operational amplifier (8) is the only component of the customer medium (1) that is fully active in "sleep"-mode.

12 Claims, 1 Drawing Sheet

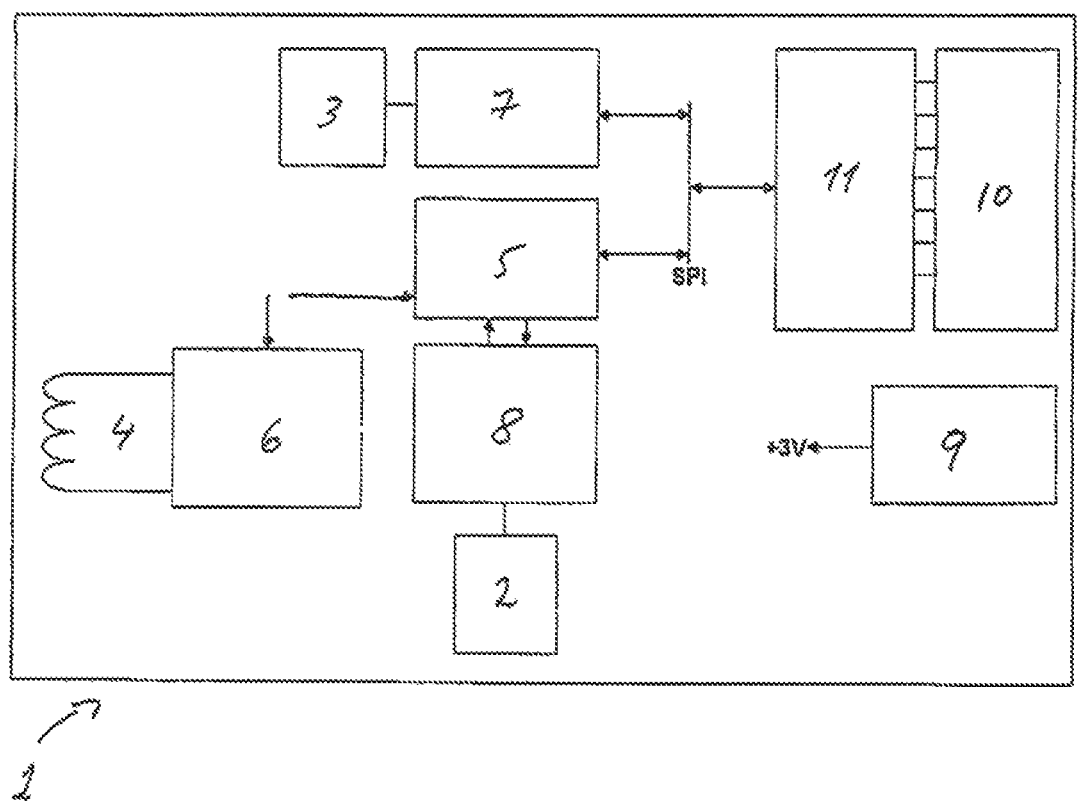

CUSTOMER MEDIUM TO RECORD THE UTILIZATION OF SERVICES

BACKGROUND OF THE INVENTION

The present invention relates to a customer medium to record the utilization of services. In particular, the invention relates to a customer medium for use in a "be-in-be-out" ticket collection system.

"Be-in-be-out" ticket collection systems are becoming increasingly popular because they offer the utmost comfort to the passengers of public transport. As part of such systems, the duration of a passenger's presence in a public transport conveyance should be continuously determined and associated with the distance covered within this time.

SUMMARY OF THE INVENTION

As basis, the present invention has taken the task of specifying a customer medium for recording the utilization of services, particularly a customer medium for use in a "be-in-be-out" ticket collection system, which has very low energy consumption and yields a robust data acquisition.

Furthermore, both a short- and long-range data acquisition should be made possible, where an encrypted data transfer should be provided.

Accordingly, a customer medium is proposed for detecting the utilization of services, in particular for use in a "be-in-be-out" ticket collection system, comprising a first, a second and a third antenna implemented on a PCB substrate. The customer medium is preferably assigned to a person. The antennas of the customer medium can be designed as dipoles, folded dipoles, "inverted F" antennas, quadrupole antennas, similar patch antennas or antenna loops and coils.

Here, the first antenna is preferably designed in the range 13 MHz-8 GHz and is used as a wake-up antenna for receiving a wake-up signal when the customer medium is in a "sleep" mode. The wake-up signal is preferably transmitted as amplitude-modulated, and includes a predetermined signal sequence, where the signal from a wake-up antenna is amplified and demodulated by operational amplifier serving as a detection module, and is evaluated by a microprocessor partially activated in the "sleep mode", where in case a valid wake-up signal is detected, i.e. a signal with the proper sequence, the microprocessor is fully activated and the transceiver of the customer medium is turned on, whereby the customer medium goes into an active mode. The operational amplifier is the only component of the customer medium that is fully active in the "Sleep"-mode, and is so configured that it has minimal power consumption. In addition, only a part of the microprocessor is activated in the "sleep mode". Moreover, the customer medium also has an idle mode, in which only the microprocessor is active in order to control the transition into "Sleep" mode or into the active mode according to predetermined routines. The microprocessor of the customer medium therefore has different modes of activity.

The second antenna receives and transmits preferably in the range of 2.4 GHz-8 GHz and is connected to an RF transceiver, where the transceiver can be activated only if the customer medium in active mode. The bit rate of the transceiver is preferably 1 or 2 Mbit/s. Data communication with corresponding reading devices can be performed via the transceiver over multiple channels with slightly different frequencies or with broadband signals in order to avoid interference with external services and in this way allow for rapid contact.

In order to reduce a risk of disruption during data transmission, a continuous change of the data channels is enabled by the transceiver (frequency hopping). For example, three "advertising channels" can be used for data transmission via the second antenna in the 2.4 GHz band to make contact with a reading device, and five "communication channels" can be used for data communication with the reading device.

The first and the second antenna are used for long-range data communication with at least one reading device of a system for detecting an access authorisation code stored on the customer medium, or to acquire said media information from the customer medium, to read data stored in the customer medium and/or for describing the customer medium. Long-range data communication in the terms of the invention is data communication with a range of more than one meter. The customer medium can be biuniquely identified by the media information, which can be determined on the basis of media information, such as whether there is an authorisation for the use a service. As an example, the media information can be a biuniqne number.

The third antenna is an antenna, preferably for the range around 13.56 MHz, which is connected to an NFC-module in the integrated circuit of the customer medium. The NFC module is preferably implemented in accordance with the ISO 18092 standard and its associated safety mechanisms and is used for the short-range data communication in the range of a few centimeters in the customer mediums active mode, for example, with a mobile control device used to check the validity of an access authorisation stored on the customer medium or for reviewing personal data.

The customer medium therefore features a "sleep" mode, an idle mode and an active mode, where only the operational amplifier and a part of the microprocessor are in the "sleep"-mode. The microprocessor of the customer medium is largely turned off in "sleep"-mode and fully turned on in idle mode and active mode, and where the transceiver is turned off in "sleep"-mode and in idle mode and is only turned on in active mode. In this way, the energy consumption of the customer medium is kept as low as possible.

The customer medium features an integrated circuit connected to the microprocessor, which comprises at least one crypto-engine, where preferably three crypto-engines are included, for example, for GRAIN 128, GRAIN 123A, 3-DES or AES-128. The microprocessor or the NFC-module can also be integrated into the integrated circuit.

The customer medium can be implemented as an active customer medium, where in this case a battery, preferably a 3-volt battery is provided to provide electricity to the components. Optionally, the customer medium can feature an LCD display and an appropriate driver and/or a device for visual and/or acoustic indicator such as a low battery status or other data or conditions of the customer medium.

As part of further embodiments, the customer medium is designed in such a manner that it is charged with energy via an HF pulse, which is emitted from at least one reading device, thus the required energy can be taken from the field of the reading device and then can be operated autonomously for a predetermined time. For this purpose, the customer medium features a capacitor for storing energy and a corresponding switching circuit. The pulse is preferably a pulse in the UHF-range.

In the event that the customer medium does not feature its own power supply, the "wake-up" signal can additionally be included in the HF pulse. Furthermore, in the event that the customer medium is provided without its own power supply, that an HF signal is sent at regular predetermined time intervals by at least one reading device in order to energise customer media within range.

Furthermore, the customer medium can have an appropriately dimensioned solar module to charge the battery in this way. As part of a further development of the invention, the customer medium has means for entering a PIN which can be implemented as a numeric keypad and/or at least one biometric sensor, such as a fingerprint sensor in order to verify the legitimacy of the use by a person.

Preferably, the customer medium has an ISO card format.

The customer medium according to this invention enables a secure and encrypted communication with appropriate reading devices with minimal power consumption, since an authentication and an encrypted data transfer are provided.

For a full understanding of the present invention, reference should now be made to the following detailed description of the preferred embodiments of the invention as illustrated in the accompanying drawing.

BRIEF DESCRIPTION OF THE DRAWING

FIG. 1 is a schematic view of the structure of a customer medium in the ISO card format.

DESCRIPTION OF THE PREFERRED EMBODIMENT

In the accompanying FIGURE, a customer medium 1 in the ISO card format is illustrated, which comprises a first antenna 2, a second antenna 3, which are designed as dipole, quadrupole, folded dipole, similar patch antennas or inverted-F antenna and features a third antenna 4, which is preferably designed as a coil on a PCB substrate. Furthermore, the customer medium features a microprocessor 5 and an integrated circuit 6 connected with the microprocessor 5, where the integrated circuit 6 or the microprocessor 5 comprises at least one crypto-engine.

Referring to the accompanying FIGURE, the customer medium 1 features an RF transceiver 7, which can send and receive via the second antenna 3 preferably in the range of 2.4 GHz, where the transceiver 7 is only activated if the customer medium 1 is in an active mode.

The first antenna 2 is preferably designed in the range 2.4 GHz and is used as a wake-up antenna for receiving an amplitude-modulated wake-up signal if the customer medium is in a "sleep" mode. The signal received by the wake-up antenna 2 is amplified and demodulated by an operational amplifier 8 serving as a wake-up detection module and processed by the part of the microprocessor 5 active in the "sleep" mode, where in case of a wake-up signal detected as valid, i.e. a signal with the proper sequence, the microprocessor 5 is completely turned on, by which the customer medium 1 enters an active mode. The operational amplifier 8 is the only component of the customer medium 1, which is fully active in "sleep"-mode, so that the energy consumption of the customer medium is minimised.

The first and second antenna 2, 3 are used for long-range data communication with at least one reading device for recording the utilisation of services, for example, to detect an access authorisation stored on the customer medium 1 or for encrypted transmission of the identity and/or other data of the user of the customer medium.

The third antenna 4 is an antenna, preferably in the range 13.56 MHz, which is connected to an NFC-module in the integrated circuit 6 of the customer medium 1. The NFC module is preferably implemented in accordance with the ISO 1802 standard and uses integrated security mechanisms. It is used in active mode of the customer medium 1 of the short-range data communication, for example with a mobile control device for checking the validity of an access authorisation stored on the customer medium 1. By means of the NFC module, the customer medium, for example, can be connected with mobile devices, for example with a mobile phone, which can serve as input and output device for the customer medium. For example, data stored in the customer device can be read in this way.

The customer medium can have one or more non-volatile memory for storing data.

As part of further embodiments, in which no short-range communication, such as via NFC is required, the third antenna 4 can be omitted, in which case only a long-range communication is possible via the first and second antennas 2, 3.

In the example shown in the FIGURE, the customer medium 1 is configured as an active customer medium, comprising a 3 V battery 9 for supplying power to the components. Optionally, the customer medium can feature an LCD display 10 and a corresponding driver 11 with minimum power consumption and/or a device for visual and/or acoustic indicator such as a low battery status. Here, information about the battery status can be transferred to external reading devices or to a mobile control device using the second or third antenna 3, 4. Preferably, the NFC module is designed in such a manner that it can be energised and read via the communication field even if the battery 9 is empty. Here, the NFC module is energised by the RF field of the active components, i.e. corresponding readers.

The customer medium according to the invention can, for example, be used as a ticket as part of a "be-in-be-out" or "check-in check-out" ticket collection system. Furthermore, the customer medium can be used as a means for determining a valid access authorisation in ski resorts, fairs, sporting or cultural events, in parking garages or as part of the "on street parking" systems. In addition, the customer medium can be used as a medium for locating a person in avalanche accidents.

There has thus been shown and described a novel customer medium to record the utilisation of services which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. Customer medium for detecting the utilization of services, wherein it comprises a first and a second antenna for long-range data communication, a third antenna, an integrated circuit comprising at least one crypto-engine, one microprocessor connected with the integrated circuit or integrated into the integrated circuit, an operational amplifier and an RF transceiver connected to the second antenna, where the third antenna is connected to an NFC-module in the integrated circuit and is used for the short-range data communication in an active mode of the customer medium, where the first antenna is used as a wake-up antenna for receiving an amplitude-modulated wake-up signal if the customer medium is in a "sleep" mode, where the signal received by the wake-up antenna is demodulated and amplified by the operational amplifier serving as the wake-up detection module and is evaluated by the microprocessor partially activated in the "sleep" mode, where the microprocessor is completely activated in the event of a wake-up signal detected as valid, by which the customer medium enters the active mode and where the operational amplifier is the only component of the customer medium that is fully active in "sleep"-mode.

2. Customer medium for recording the utilization of services, according to claim 1, wherein it features an idle-mode, in which only the microprocessor is active in order to control the transition into the "sleep"-mode or into the active mode according to predetermined routines.

3. Customer medium for detecting the utilization of services, according to claim 2, wherein only the operational amplifier and a part of the microprocessor is activated in the "sleep" mode, that the microprocessor is turned on in the idle-mode and active mode and that the transceiver is turned off in "sleep"-mode and in idle-mode and only turned on in active mode, thereby minimising the energy consumption of the customer medium.

4. Customer medium for recording the utilization of services, according to claim 1, wherein it is implemented as active customer medium, where it comprises a battery for the power supply of the components.

5. Customer medium for recording the utilization of services, according to claim 4, wherein it comprises an appropriately dimensioned solar panel to supply power to the battery.

6. Customer medium according to claim 1, wherein it is designed in such a manner that it is charged with energy via an HF-pulse, and then can operate autonomously for a predetermined time.

7. Customer medium according to claim 6, the "wake-up signal" for the customer medium is included in the HF-pulse.

8. Customer medium for recording the utilization of services according to claim 1, wherein it features an LCD display and a corresponding driver with minimum power consumption and/or a device for the visual and/or acoustic indicator for a low battery status.

9. Customer medium for recording the utilization of services according to claim 1, wherein it features means to enter a PIN and/or a biometric sensor, in order to verify the validity of the use by a person.

10. Customer medium for recording the utilization of services, according to claim 1, wherein it has an ISO card format.

11. Customer medium for recording the utilization of services according to claim 1, wherein the antennas of the customer medium are designed as dipoles, folded dipoles, "inverted F" antenna, quadrupole antennas, similar patch antennas or antenna loops and coils on a PCB substrate.

12. Use of a customer medium according to claim 1 as a ticket as part of a "be-in-be-out"- or "check-in check-out"-ticket collection system.

* * * * *